(12) United States Patent
Andreoli-Fang et al.

(10) Patent No.: US 11,825,355 B1
(45) Date of Patent: *Nov. 21, 2023

(54) SYSTEMS AND METHODS FOR MITIGATING DELAY IN AVAILABILITY OF DATA IN A COMMUNICATION NETWORK

(71) Applicant: CABLE TELEVISION LABORATORIES, INC., Louisville, CO (US)

(72) Inventors: Jennifer Andreoli-Fang, Boulder, CO (US); Joseph Padden, Boulder, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 70 days.

This patent is subject to a terminal disclaimer.

(21) Appl. No.: 17/315,510

(22) Filed: May 10, 2021

Related U.S. Application Data

(63) Continuation of application No. 16/242,778, filed on Jan. 8, 2019, now Pat. No. 11,006,324.

(60) Provisional application No. 62/614,878, filed on Jan. 8, 2018.

(51) Int. Cl.
*H04W 28/26* (2009.01)
*H04W 28/02* (2009.01)

(52) U.S. Cl.
CPC ........... *H04W 28/26* (2013.01); *H04W 28/02* (2013.01)

(58) Field of Classification Search
CPC ............................... H04W 28/26; H04W 28/02

USPC ......................................................... 370/328
See application file for complete search history.

(56) References Cited

U.S. PATENT DOCUMENTS

| 2008/0020797 | A1 | 1/2008 | Denney et al. | |
|---|---|---|---|---|
| 2008/0052784 | A1 | 2/2008 | Wiley et al. | |
| 2009/0041163 | A1* | 2/2009 | Jonsson | H04B 1/7113 375/147 |
| 2016/0233980 | A1 | 8/2016 | Pantelias et al. | |
| 2017/0118616 | A1 | 4/2017 | Kothari et al. | |
| 2017/0265216 | A1* | 9/2017 | Andreoli-Fang | H04W 72/52 |
| 2019/0274064 | A1* | 9/2019 | Chapman | H04W 72/52 |

* cited by examiner

*Primary Examiner* — Huy D Vu
*Assistant Examiner* — Nizam U Ahmed
(74) *Attorney, Agent, or Firm* — PdZ Patent Law, PLLC

(57) ABSTRACT

A method for mitigating delay in availability of data in a communication network includes predicting an amount of data to egress a first communication device; modifying the predicted amount of data to egress the first communication device according to a data delay profile, to generate a first signal representing anticipated upcoming data transmission by the first communication device, where the data delay profile represents delay in availability of data at the first communication device; transmitting the first signal from the first communication device to the second communication device; generating one or more Grants at the second communication device at least partially in accordance with the first signal, each Grant authorizing the first communication device to transfer data via the network; and transmitting the one or more Grants from the second communication device to the first communication device.

20 Claims, 12 Drawing Sheets

SYSTEMS AND METHODS FOR MITIGATING DELAY IN AVAILABILITY OF DATA IN A COMMUNICATION NETWORK

RELATED APPLICATIONS

This application is a continuation of U.S. patent application Ser. No. 16/242,778, filed on Jan. 8, 2019, which claims benefit of priority of U.S. Provisional Patent Application Ser. No. 62/614,878, filed on Jan. 8, 2018. Each of the aforementioned applications is incorporated herein by reference.

BACKGROUND

Wireless base stations are rapidly proliferating to meet the growing demand for wireless communication capacity and to support new technologies, such as fifth-generation (5G) wireless communication technologies and beyond. A wireless base station requires a backhaul link connection to provide network services to the wireless base station. Backhaul link connections are conventionally provided by dedicated communication mediums, such as dedicated fiber optic communication mediums. While dedicated communication mediums can achieve high performance, they are frequently expensive to install and operate. Additionally, dedicated communication mediums are not available at all locations.

Consequently, there is significant interest in using non-dedicated access networks, such as cable television access networks or telecommunication access networks, to provide backhaul link connections for wireless base stations. Access networks are often essentially ubiquitous in urban and suburban areas, and therefore, access networks can often provide backhaul link connections with minimal additional infrastructure, which promotes low-cost and fast installation.

DETAILED DESCRIPTION OF THE EMBODIMENTS

Figure 1:
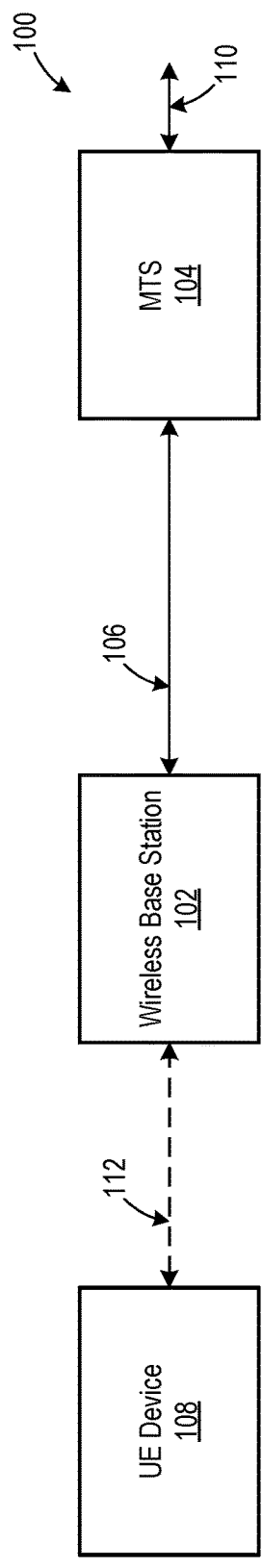
FIG. 1 is a schematic diagram illustrating a portion of a communication network configured to provide a backhaul link to a wireless base station.

While non-dedicated access networks can provide low-cost backhaul link connections for wireless base stations, many non-dedicated access networks may experience significant uplink latency. For example, an access network, such as but not limited to a cable access network, may experience uplink latency of 6 to 25 milliseconds (ms) under typical operating conditions, and a passive optical network (PON) may experience similar uplink latency. FIG. 1 is a schematic diagram illustrating a portion 100 of a communication network configured to provide a backhaul link to a wireless base station. Network portion 100 includes a wireless base station 102, a modem termination system (MTS) 104, a communication medium 106, and a user equipment (UE) device 108. In this document, a MTS includes, but is not limited to, one or more of a cable modem termination system (CMTS), an optical network terminal (ONT), an optical line terminal (OLT), an optical network unit (ONU), a network termination unit, a digital subscriber line (DSL) termination unit, a satellite termination unit, and other termination unit. Communication medium 106 provides a backhaul link connection for wireless base station 102; i.e., communication medium 106 communicatively couples wireless base station 102 and MTS 104. MTS 104 is communicatively coupled to other portions of the network (not shown), e.g., to a modem between and in communication with base station 102 and MTS 104 via a communication medium 106 and to a core network switch via a communication link 110. Wireless base station 102 is, for example, a long-term evolution (LTE) wireless base station, an eNodeB, a gNodeB, any similar wireless base station, and/or may be any variations, improvement and/or evolutions thereof. UE device 108 is, for example and without limitation, a mobile telephone, laptop, smartwatch, Internet of Things (IoT) device, a wearable device with wireless capability, a medical device, or a tablet computer. UE 108 may be Subscriber Identity Module (SIM) enabled, Virtual SIM (vSIM) enabled, or non-SIM enabled, such as any variant of a public key infrastructure (PKI) enabled device. UE device 108 wirelessly communicates with wireless base station 102 via radio signals 112.

Wireless base station 102 communicates with MTS 104 over communication medium 106 using an access network technology, such as but not limited to a data over cable service interface specification (DOCSIS) protocol. Accordingly, there is little downlink latency over communication medium 106, i.e., there is little latency when transmitting data from MTS 104 to wireless base station 102. However, there may be significant uplink latency over communication medium 106, i.e., there may be significant latency when transmitting data from wireless base station 102 to MTS 104.

Figure 2:
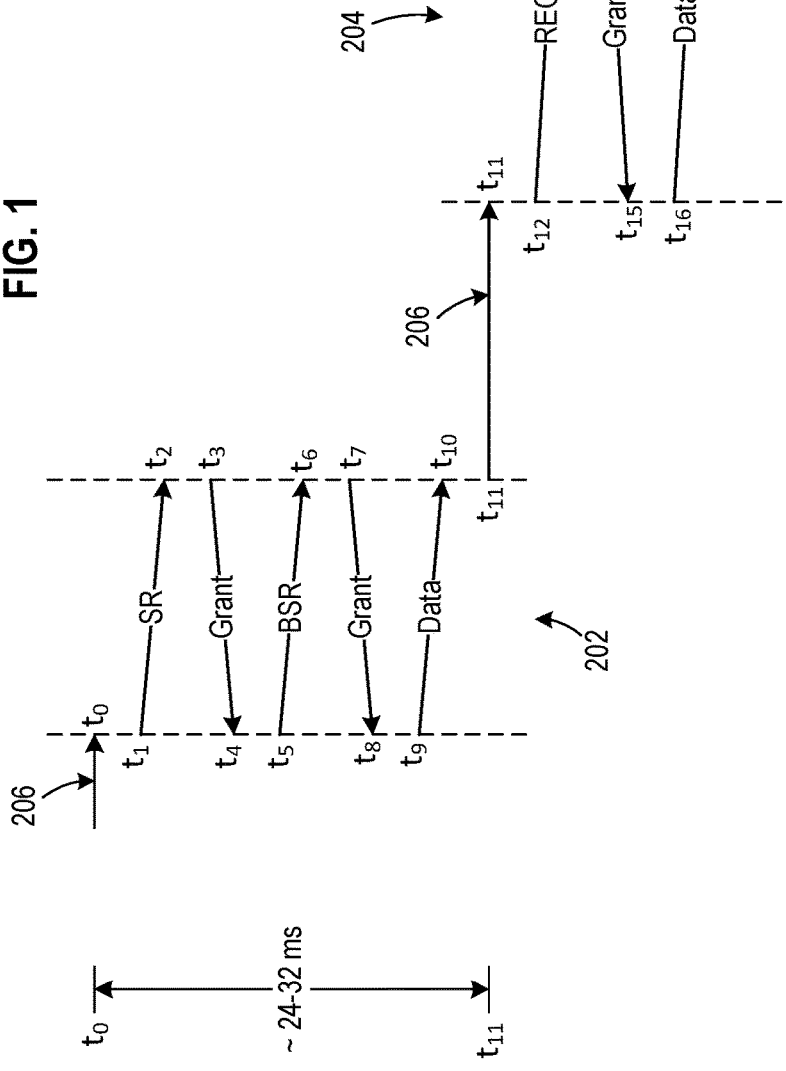
FIG. 2 is a schematic diagram illustrating an example of uplink data transmission in the network portion of FIG. 1.

FIG. 2 is a schematic diagram illustrating an example of uplink data transmission in the network portion 100. In the example of FIG. 2, wireless base station 102 is a LTE wireless base station, but may be any wireless base station as detailed above. FIG. 2 includes a timeline 202 and a timeline 204, which are not drawn to scale. Timeline 202 represents transmission of data from UE device 108 to wireless base station 102. Timeline 202 begins at time to with a buffer of UE device 108 receiving data 206. At time $t_1$, UE device 108 sends a service request (SR) to wireless base station 102, where the SR represents a request for uplink resources, i.e., for resources to transfer data 206 to wireless base station 102. Wireless base station 102 receives the SR at time $t_2$, and wireless base station 102 responds to the SR by sending a Grant for a Buffer Status Report (BSR) at time $t_3$. UE device 108 receives the Grant at time $t_4$, and UE device 108 responds to the Grant by sending a BSR at time $t_5$. The BSR indicates, for example, an amount of data in UE device 108's buffer and may optionally include metadata, e.g., classification of the data or types of data in the buffer. Wireless base station 102 responds to the BSR by sending at time $t_7$ a Grant for UE device 108 to send data, and UE device 108 receives the Grant at time $t_8$. UE device 108 responds to the Grant at time $t_9$ by sending data 206 to wireless base station 102, and wireless base station 102 begins to receive data 206 at time $t_{10}$. Data 206 is completely received by wireless base station 102 at time $t_{11}$.

Timeline 204 represents transmission of data from wireless base station 102 to MTS 104. Timeline 204 begins at time $t_{11}$ with data 206 being completely received by wireless base station 102, such that timeline 204 begins when timeline 202 ends. At time $t_{12}$ of timeline 204, wireless base station 102 responds to receipt of data 206 by sending a Request (REQ) to MTS 104. MTS 104 receives the REQ at time $t_{13}$, and MTS 104 responds at time $t_{14}$ by sending a Grant to wireless base station 102. Wireless base station 102 receives the Grant at time $t_{15}$, and wireless base station 102 responds to the Grant at time $t_{16}$ by sending data 206 to MTS 104, and MTS 206 begins to receive data 206 at time $t_{17}$. Data 206 is completely received by MTS 104 at time $t_{18}$, and MTS 104 may subsequently transmit data 206 other portions of the network via communication link 110.

The time required to transmit data 206 from UE device 108 to wireless base station 102 is approximately 24 to 32 ms, and the time required to transmit data 206 from wireless base station 102 to MTS 104 is approximately 6 to 25 ms. Consequently, the time required to transmit data from UE device 108 to MTS 104 is approximately 30 to 57 ms, although the time can be significantly longer in some cases. Accordingly, network portion 100 experiences significantly uplink latency when transmitting data 206 from UE device 108 to MTS 104.

Figure 3:
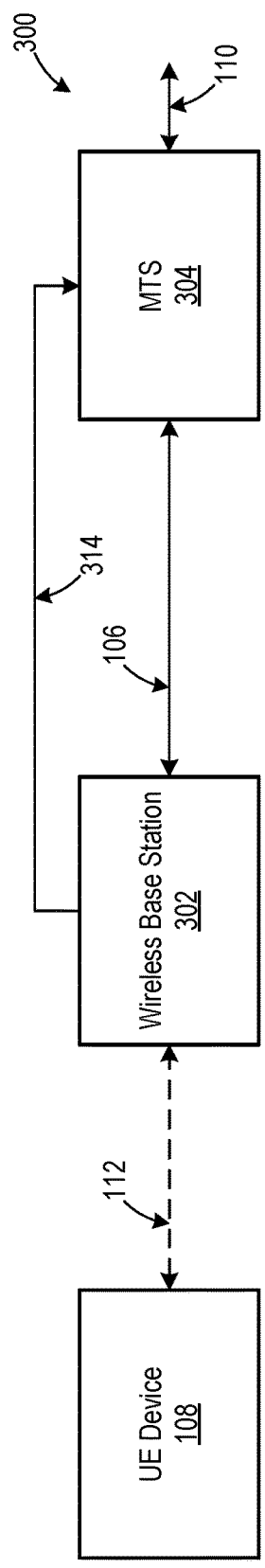
FIG. 3 is a schematic diagram illustrating a portion of a communication network that is modified to reduce latency.

Uplink latency can be reduced by modifying one or both of wireless base station 102 and MTS 104 such that timelines 202 and 204 partially overlap. For example, FIG. 3 is a schematic diagram illustrating a portion 300 of an access network which is modified to reduce uplink latency. Network portion 300 is similar to network portion 100 of FIG. 1, but wireless base station 102 and MTS 104 are replaced with a wireless base station 302 and a MTS 304, respectively. Wireless base station 302 differs from wireless base station 102 in that wireless base station 302 is further configured to (a) predict an amount of data that will egress wireless base station 302 and (b) send a signal 314 to MTS 304 representing anticipated upcoming data transmission by wireless base station 302. Signal 314 is sometimes referred to a bandwidth report (BWR). MTS 304 differs from MTS 104 in that MTS 304 is further configured to receive and process signal 314 to generate a Grant and send the generated Grant to wireless base station 302. Consequently, the process of transferring data from wireless base station 302 to MTS 304 begins before data 206 is completely received by wireless base station 302 from UE device 108.

Figure 4:
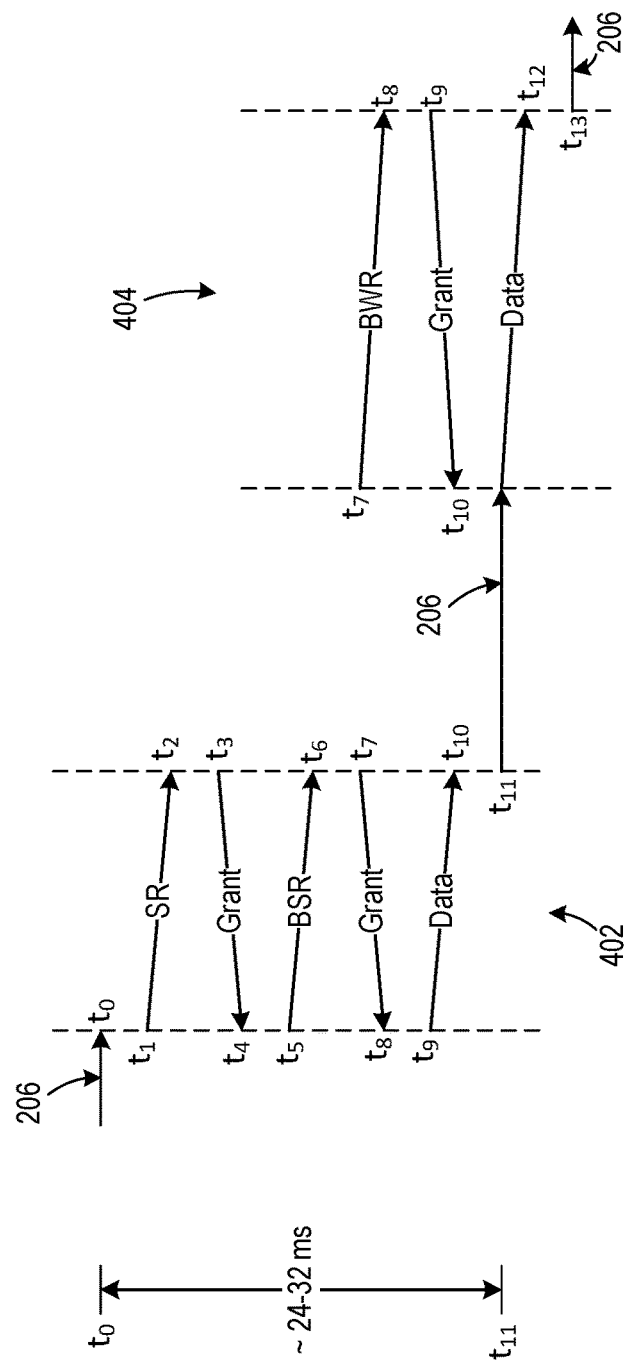
FIG. 4 is a schematic diagram illustrating an example of uplink data transmission in the network portion of FIG. 3.

FIG. 4 is a schematic diagram illustrating an example of uplink data transmission in the network portion 300. FIG. 4 includes a timeline 402 and a timeline 404, which are not drawn to scale. Timeline 402 represents transmission of data from UE device 108 to wireless base station 302, and timeline 402 is like timeline 202 of FIG. 2.

Timeline 404 represents transmission of data from wireless base station 302 to MTS 304. Timeline 404 begins at time $t_7$ with wireless base station 304 sending a BWR to MTS 304 in response to wireless base station 304 receiving the B SR from UE device 108. MTS 404 receives the BWR at time $t_8$, and MTS 304 responds by sending a Grant to wireless base station 302 at time $t_9$. Wireless base station 302 receives the Grant at time $t_{10}$, and wireless base station 302 is therefore able to transfer data 206 to MTS 304 when data 206 is completely received by wireless base station at time $t_{11}$. Accordingly, network portion 300 is able to provide just-in-time transfer of data 206 from wireless base station 302 to MTS 304. Therefore, timelines 402 and 404 substantially overlap, and relatively little time is required to transmit data 206 from wireless base station 302 to MTS 304. As a result, network portion 300 will experience significantly lower uplink latency than network portion 100 of FIG. 1.

In a separate yet similar embodiment (not shown), the process of transferring data from wireless base station 302 to MTS 304 occurs at least earlier than that described for the embodiment of FIG. 1, which results in a latency reduction. An example of such an embodiment is the BWR is sent from base station 302 at time $t_{10}$ and the Grant is received at or just after time $t_{11}$. In such an embodiment uplink latency (also called access network latency) is not eliminated, although it is still advantageously reduced.

Figure 5:
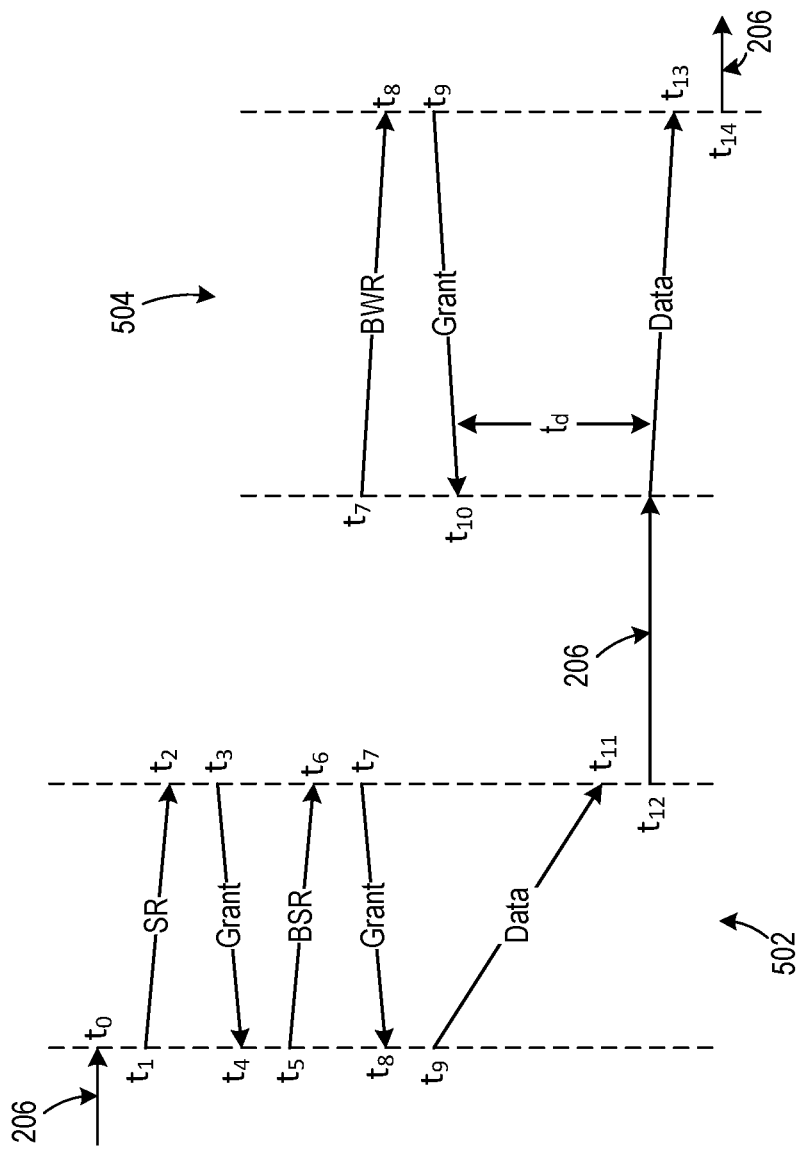
FIG. 5 is a schematic diagram illustrating an example of uplink data transmission in the network portion of FIG. 4 where availability of data at a wireless base station is delayed.

The techniques for reducing latency illustrated in FIGS. 3 and 4 can be very effective. However, Applicant has found that delays in data availability at wireless base station 302 can result in significant latency and/or waste of communication medium 106's transmission capacity. For example, FIG. 5 is a schematic diagram illustrating an example of uplink data transmission in network portion 300 when availability of data 206 at wireless base station 302 is delayed. FIG. 5 includes a timeline 502 and a timeline 504, which are not drawn to scale. Timeline 502 represents transmission of data from UE device 108 to wireless base station 302. Timeline 502 is like timelines 202 and 402 of FIGS. 2 and 4, respectively, but with data 206 not being completely received at wireless base station 302 until time $t_{12}$. Consequently, data is not available at wireless base station 302 for transmission to MTS 304 until time $t_{12}$. Such delay in availability of data 206 at wireless base station 302 may be caused by failure of data 206 to be transmitted from UE device 108 to wireless base station 302, such as due to interference with radio signals 112. Delay in availability of data 206 at wireless base station 302 may also be caused by fragmentation of data being transmitted from UE device 108 to wireless base station 302. Fragmentation of data being transmitted from UE device 108 to wireless base station 302 causes data 206 to be transmitted from UE device 108 to wireless base station 302 over two or more transmission time intervals (TTIs) instead of in one TTI, thereby delaying arrival of data 206 at wireless base station 302.

Timeline 504 represents transmission of data from wireless base station 302 to MTS 304. Timeline 504 is like timeline 404, but transmission of data from wireless base station 302 to MTS 304 is not complete until time $t_{13}$, due to the delay in data 206 availability at wireless base station 302. Consequently, communication medium 106's transmission capacity is wasted for a duration $t_d$ from time $t_{10}$ to time $t_{12}$.

Figure 6:
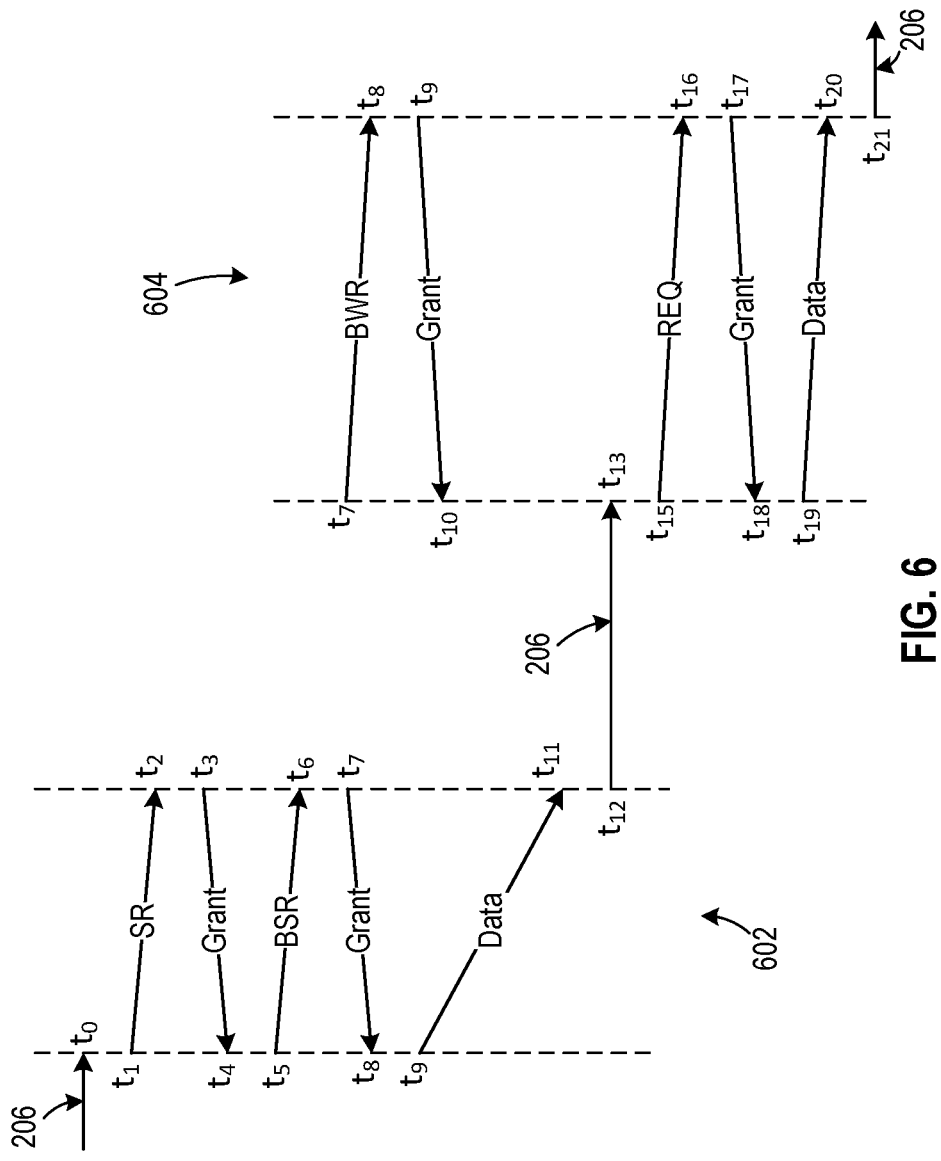
FIG. 6 is schematic diagram illustrating another example of uplink data transmission in the network portion of FIG. 4 where availability of data at a wireless base station is delayed.

FIG. 6 is a schematic diagram illustrating another example of uplink data transmission in network portion 300 with availability of data 206 at wireless base station 302 being delayed. FIG. 6 includes a timeline 602 and a timeline 604, which are not drawn to scale. Timeline 602 represents transmission of data from UE device 108 to wireless base station 302. Timeline 602 is like timeline 202 of FIG. 2, but where data 206 is not completely received at wireless base station 302 until time $t_{12}$. Consequently, data is not available at wireless base station 202 for transmission to MTS 304 until time $t_{12}$. The delay in data 206 availability is caused, for example, by failure of data 206 to be transmitted from UE device 108 to wireless base station 302, and/or by fragmentation of data being transmitted from UE device 108 to wireless base station 302.

Timeline 604 represents transmission of data from wireless base station 302 to MTS 304. Timeline 604 is like timeline 404, but the Grant sent from MTS 304 to wireless base station 302 at time $t_9$ expired before data 206 was available at wireless base station 302 at time $t_{13}$. Consequently, no Grant is available at time $t_{13}$, and wireless base station 302 must therefore send a REQ to MTS 304 at time $t_{15}$ to obtain uplink resources. Wireless base station 302 cannot begin to transmit data 206 to MTS 104 until wireless base station 302 receives a Grant at time $t_{18}$. Therefore, transmission of data 206 from wireless base station 302 to MTS 304 is not complete until time $t_{21}$, resulting in significant latency in transfer of data from UE device 108 to MTS 304.

Disclosed herein are systems and methods for mitigating delay in availability of data in a network. Certain embodiments of the disclosed systems and methods can reduce, or even essentially eliminate, waste of communication media transmission capacity and/or increase in latency caused by delay in data availability in a communication network. Particular embodiments include a data delay profile representing delay in availability of data at a communication device. Additionally, in these embodiments, a predicted amount of data to egress the communication device is modified according to the data delay profile, to generate a signal representing anticipated upcoming data transmission by the communication device. The signal is then used to generate Grants authorizing the first communication device to transfer data.

Figure 7:
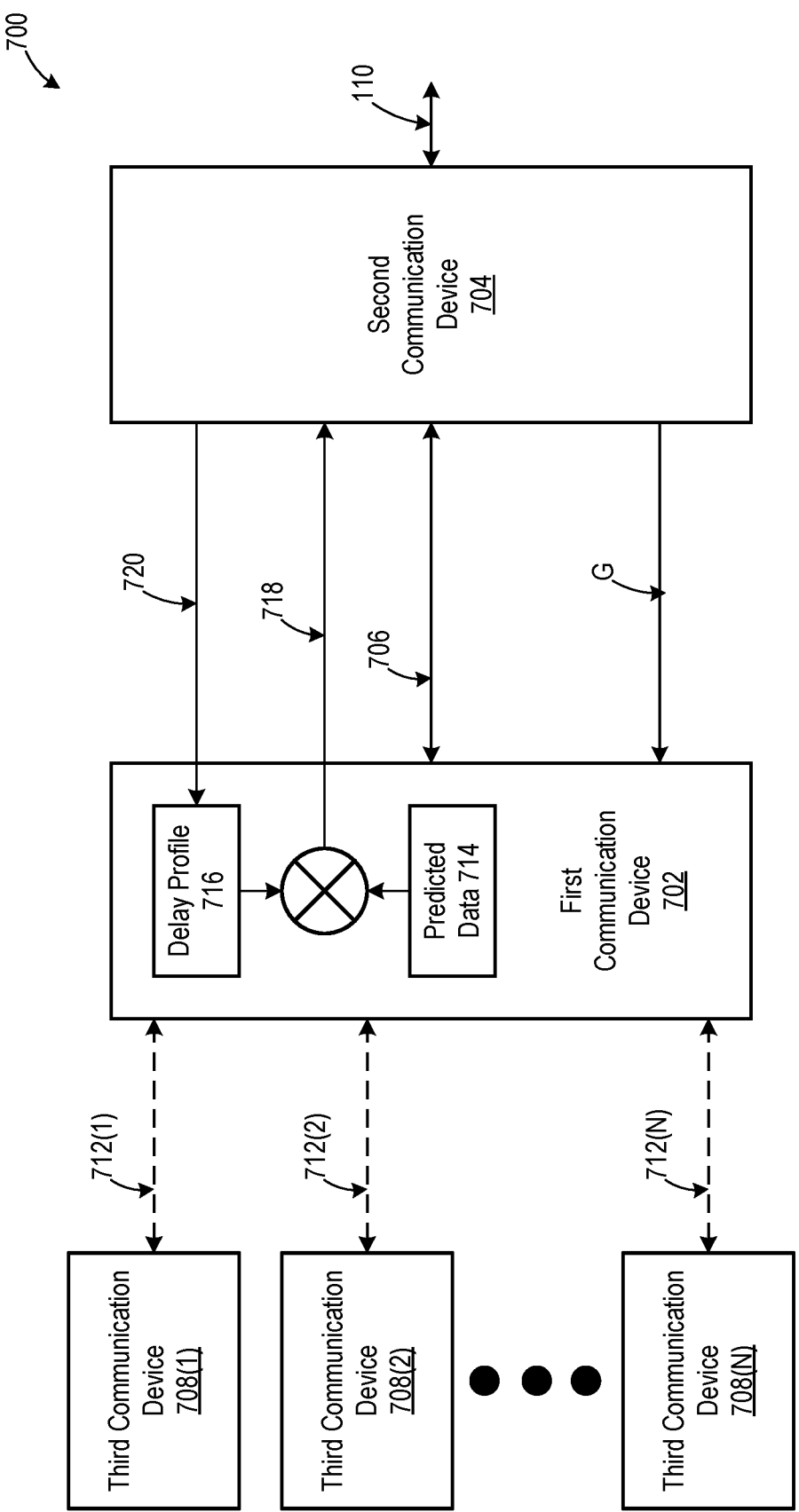
FIG. 7 is a schematic diagram of a portion of a communication network configured to mitigate delay in availability of data in the network, according to an embodiment.

FIG. 7 is a schematic diagram of a portion 700 of a communication network configured to mitigate delay in availability of data in the network. Network portion 700 includes a first communication device 702, a second communication device 704, one or more communication mediums 706, and N third communication devices 708, wherein N is an integer greater than or equal to one. Although FIG. 7 illustrates N being greater than 2, N could be 1 or 2 without departing from the scope hereof In this document, specific instances of an item may be referred to by use of a numeral in parentheses (e.g., third communication device 708(1)) while numerals without parentheses refer to any such item (e.g., third communication devices 708). Communication mediums 706 communicatively couple first communication device 702 with second communication device 704, e.g., to provide a backhaul link connection for first communication device 702. Network portion 700 may include additional elements without departing from the scope hereof. For example, network portion 700 may include additional instances (not shown) of first communication device 702 communicatively coupled to the second communication device 704 via communication mediums 706.

The embodiment of FIG. 7 is described in a backhaul application of the present systems and methods. It will be understood that the ideas disclosed here may also be applied to backhaul, fronthaul, mid-haul, and cross-haul applications, together called herein x-haul or x-hauling.

In particular embodiments, first communication device 702 is a wireless base station, e.g., a third-generation (3G) wireless base station, a LTE wireless base station, a 5G wireless base station, a sixth-generation (6G) wireless station, an eNodeB, a gNodeB, any similar wireless base station, a component of a split wireless base station (e.g. a radio unit), and/ or any variations, improvement and/or evolutions thereof. Each third communication device 708 is a UE device, for example and without limitation, a mobile telephone, a laptop computer, a smartwatch, an Internet of Things (IoT) device, a wearable device with wireless capability, a medical device, or a tablet computer. Each third communication device 708 may be SIM enabled, vSIM enabled, or non-SIM enabled, such as any variant of a PKI enabled device. In these embodiments, the UE devices wirelessly communicate with the wireless base station via radio signals 712. Second communication device 704 is, for example, a MTS, or a component of a split wireless base station (e.g., a controller of multiple radio units in a high-level split wireless base station system).

In certain embodiments, communication mediums 706 include one or more of a coaxial cable communication medium, a fiber optic communication medium, a twisted-pair communication medium, and a wireless communication medium (e.g., a satellite communication medium, a microwave communication medium, a Wi-Fi communication medium, or a multiple-in/multiple-out (MIMO) communication medium). The type of protocol(s) used to transmit data through communication mediums 706 will depend of the type of communication media and endpoint device(s). For example, in embodiments where second communication device 704 is a CMTS, communication mediums 706 include a coaxial cable communication medium or a Hybrid Fiber Coaxial (HFC) communication medium, and data is transmitted through the coaxial cable communication medium via a DOCSIS protocol. In embodiments where second communication device 704 is an OLT, an ONT, or an ONU, communication mediums 706 include a fiber optic communication medium. Data is transmitted through the fiber optic communication medium, for example, using an optical protocol such as, but not limited to, an Ethernet passive optical network (EPON) protocol, a radio frequency of over glass (RFOG) protocol, or a Gigabit-capable passive optical network (GPON) protocol. In embodiments where second communication device 704 is a satellite termination unit, communication mediums 706 include a wireless communication medium, and data is transmitted through the wireless communication medium using a satellite communication protocol. In embodiments where second communication device 704 is a Wi-Fi access point, communication mediums 706 include a wireless communication medium, and data is transmitted through the wireless communication medium using a Wi-Fi protocol. Although communication mediums 706 are illustrated as a single element, communication mediums 706 may include multiple elements, e.g., multiple cables, and communication mediums 706 may include active devices, e.g., amplifiers or repeaters, without departing from the scope hereof.

First communication device 702 and second communication device 704 collectively mitigate delay in availability of data at first communication device 702. A delay in availability of data may be caused, for example, by failure of data to be transmitted from third communication devices 708 to first communication device 702 and/or by fragmentation of data being transmitted from third communication devices 708 to first communication device 702. Specifically, first communication device 702 is configured to predict an amount of data 714 to egress first communication device 702. In particular embodiments, first communication device 702 performs this prediction, at least in part, from a collective amount of data specified in one or more BSRs, or analogous signals, received from third communication devices 708. For example, if first communication device 702 receives multiple BSRs indicating that third communication devices 708 collectively have 1 gigabyte (GB) of data in their buffers, first communication device 702 would predict that 1 GB of data will egress first communication device 702 in a TTI, in this embodiment.

First communication device 702 is further configured to obtain, e.g., from a memory (not shown), or generate, a delay profile 716 representing delay in availability of data at first communication device 702. In some embodiments, delay profile 716 represents delay due to failure of data to be transmitted from one or more third communication devices 708 to first communication device 702. In some other embodiments, delay profile 716 represents delay due to fragmentation of data being transmitted from one or more third communication devices 708 to first communication device 702. In yet other embodiments, delay profile 716 represents both (a) delay due to failure of data to be transmitted from one or more third communication devices 708 to first communication device 702 and (b) delay due to fragmentation of data being transmitted from one or more third communication devices 708 to first communication device 702.

First communication device 702 is additionally configured to modify predicted amount of data 714 according to delay profile 716 to generate a signal 718, where signal 718 represents anticipated upcoming data transmission by first communication device 702 to second communication device 704. For example, in some embodiments, first communication device 702 is configured to multiply predicted amount of data 714 by delay profile 716 to generate signal 718, as illustrated in FIG. 7. However, first communication device 702 may be configured to modify predicted amount of data 714 according to delay profile 716 in another manner, such as by dividing predicted amount of data 714 by delay profile 716, without departing from the scope hereof. Discussed below with respect to FIGS. 8-11 are several examples of first communication device 702 generating signal 718.

Figure 8:
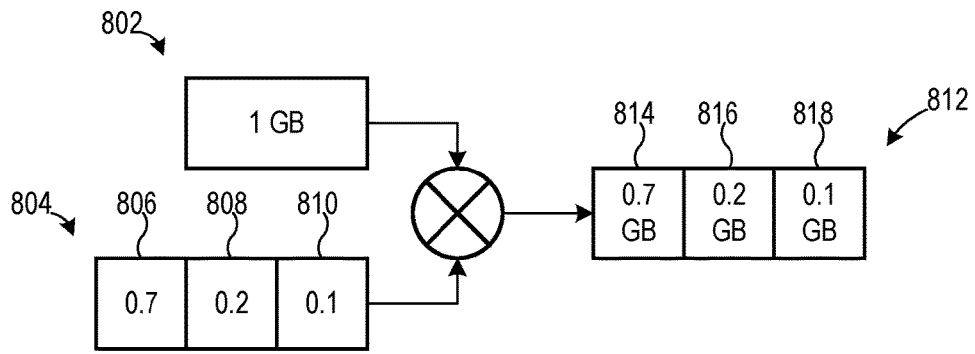
FIG. 8 is a schematic diagram illustrating an example of generating a signal using a delay profile representing delay due to fragmentation of data, according to an embodiment.

FIG. 8 is a schematic diagram illustrating an example of generating signal 718 where delay profile 716 represents delay due to fragmentation of data being transmitted from one or more third communication devices 708 to first communication device 702. FIG. 8 illustrates a predicted amount of data 802, a delay profile 804, and a signal 812, which are embodiments of predicted amount of data 714, delay profile 716, and signal 718, respectively. In this example, predicated amount of data 802 is 1 GB, and delay profile 804 includes three coefficients or "taps" 806, 808, 810. Tap 806 represents a portion of predicated amount of data 802 that is available at first communication device 702 without delay, tap 808 represents a portion of predicated amount of data 802 that is available at first communication device 702 with a delay of one TTI, and tap 810 represents a portion of predicated amount of data 802 that is available at first communication device 702 with a delay of two TTIs. First communication device 702 multiplies predicated amount of data 802 by delay profile to 804 yield signal 812 having coefficients 814, 816, and 818. Coefficient 814 indicates that 0.7 GB of data is predicted to be ready for transfer from first communication device 702 to second communication device 704 at a first TTI, e.g. $TTI_0$. Coefficient 816 indicates that 0.2 GB of data is predicted to be ready for transfer from first communication device 702 to second communication device 704 at a second TTI, e.g. $TTI_1$. Coefficient 818, in turn, indicates that 0.1 GB of data is predicted to be ready for transfer from first communication device 702 to second communication device 704 at a third TTI, e.g. $TTI_2$.

Although the taps of the delay profile in FIG. 8 sum to one, the sum of taps in delay profile 716 may vary without departing from the scope hereof In general, the smaller the sum of taps in delay profile 716, the less likelihood that transmission capacity of communication mediums 706 will be wasted due to delay in availability of data at first communication device 702. On the flip-side, the larger the sum of taps in delay profile 716, the less likelihood that transmission of data from first communication device 702 to second communication device 704 will be delayed due to delay in availability of data at first communication device 702. Additionally, while the delay profile of FIG. 8 includes three taps, the number of taps in delay profile 716 may also vary without departing from the scope hereof. A large number of taps in delay profile 716 promotes accurate characterization of delay in availability of data at first communication device 702, while a small number of taps in delay profile 716 helps minimize required processing resources in first communication device 702.

Figure 9:
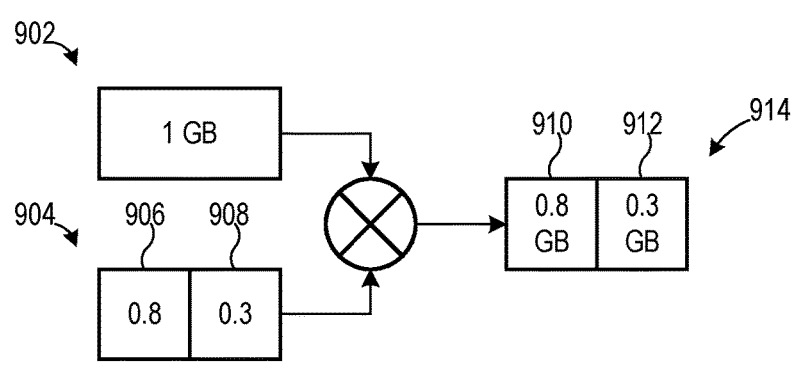
FIG. 9 is a schematic diagram illustrating another example of generating a signal using a delay profile representing delay due to fragmentation of data, according to an embodiment.

FIG. 9 is a schematic diagram illustrating another example of generating signal 718 where delay profile 716 represents delay due to fragmentation of data being transmitted from one or more third communication devices 708 to first communication device 702. In this example, the delay profile includes only two taps, and these two taps sum to a number that is greater than one. FIG. 9 illustrates a predicted amount of data 902, a delay profile 904, and a signal 914, which are embodiments of predicted amount of data 714, delay profile 716, and signal 718, respectively. In this example, predicated amount of data 902 is 1 GB, and delay profile 904 includes two taps 906 and 908. Tap 906 represents a portion of predicated amount of data 902 that is available at first communication device 702 without delay, and tap 908 represents a portion of predicated amount of data 902 that is available at first communication device 702 with a delay of one TTI. First communication device 702 multiplies predicated amount of data 902 by delay profile 904 to yield signal 914 having coefficients 910 and 912. Coefficient 910 indicates that 0.8 GB of data is predicted to be ready for transfer from first communication device 702 to second communication device 704 at a first TTI, e.g. $TTI_0$.

Coefficient 912 indicates that 0.3 GB of data is predicted to be ready for transfer from first communication device 702 to second communication device 704 at a second TTI, e.g. $TTI_1$.

Failure of data to be transmitted from third communication devices 708 to first communication device 702 will typically cause a greater delay in availability of data at first communication device 702 than fragmentation of data being transmitted from third communication devices 708 to first communication device 702. Therefore, in embodiments where delay profile 716 represents delay due to transmission failure, delay profile 716 may be configured to indicate that data availability will be delayed by more than two TTIs.

Figure 10:
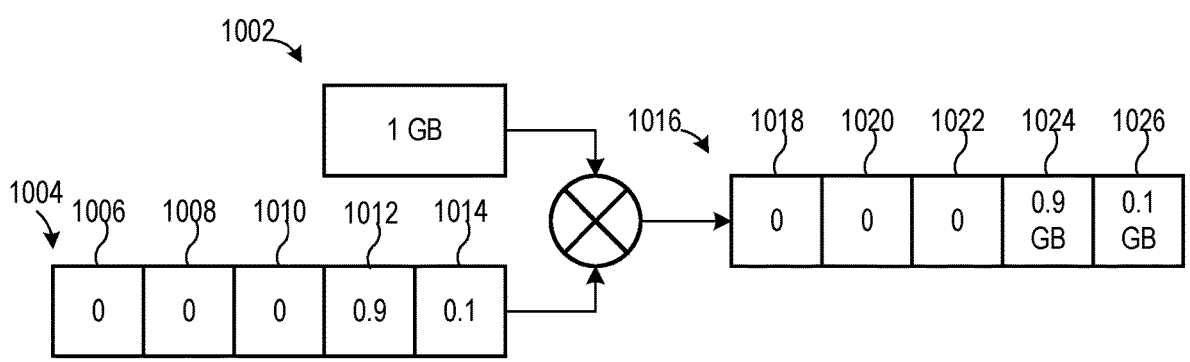
FIG. 10 is a schematic diagram illustrating an example of generating a signal using a delay profile representing delay due to data transmission failure, according to an embodiment.

For example, FIG. 10 is a schematic diagram illustrating an example of generating signal 718 where delay profile 716 represents delay due to failure to transmit data from one or more third communication devices 708 to first communication device 702. FIG. 10 illustrates a predicted amount of data 1002, a delay profile 1004, and a signal 1016, which are embodiments of predicted amount of data 714, delay profile 716, and signal 718, respectively. In this example, predicated amount of data 1002 is 1 GB, and delay profile 1004 includes five taps 1006, 1008, 1010, 1012, and 1014. Taps 1006-1010 are each zero to represent that no portion of predicated amount of data 1002 is anticipated to be available at first communication device 702 with a delay of zero, one, or two TTIs. Tap 1012 represents a portion of predicated amount of data 1002 that is available at first communication device 702 with a delay of three TTIs, and tap 1014 represents a portion of predicated amount of data 1002 that is available at first communication device 702 with a delay of four TTIs.

First communication device 702 multiplies predicated amount of data 1002 by delay profile to 1004 generate signal 1016 having coefficients 1018, 1020, 1022, 1024, and 1026. Coefficients 1018, 1020, and 1022 indicate that no data is predicted to be ready for transfer from first communication device 702 to second communication device 704 at a first, second, and third TTIs, e.g. $TTI_0$, $TTI_1$, and $TTI_2$. Coefficient 1024 indicates that 0.9 GB of data is predicted to be ready for transfer from first communication device 702 to second communication device 704 at a fourth TTI, e.g. $TTI_3$. Coefficient 1026 indicates that 0.1 GB of data is predicted to be ready for transfer from first communication device 702 to second communication device 704 at a fifth TTI, e.g. $TTI_4$.

Figure 11:
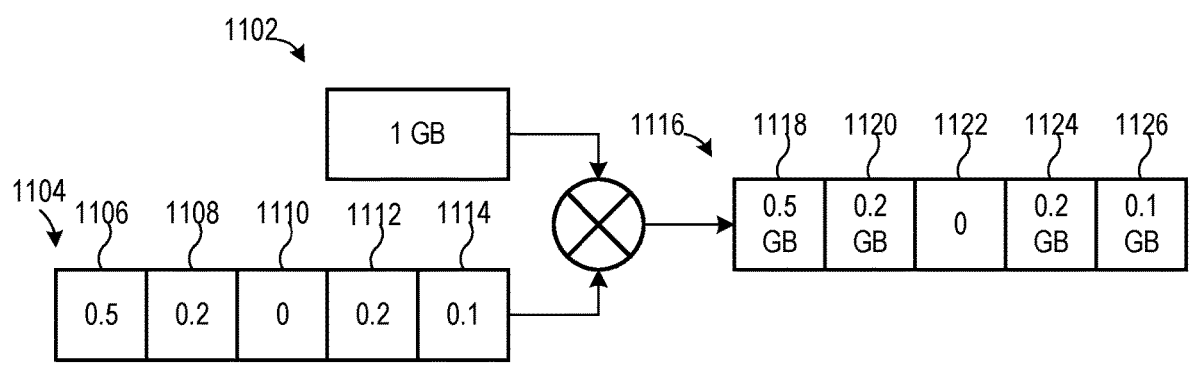
FIG. 11 is a schematic diagram illustrating an example of generating a signal using a delay profile representing delay due to both data transmission failure and fragmentation of data, according to an embodiment.

FIG. 11 is a schematic diagram illustrating an example of generating signal 718 where delay profile 716 represents delay due to both (a) delay due to failure of data to be transmitted from one or more third communication devices 708 to first communication device 702 and (b) delay due to fragmentation of data being transmitted from one or more third communication devices 708 to first communication device 702. FIG. 11 illustrates a predicted amount of data 1102, a delay profile 1104, and a signal 1116, which are embodiments of predicted amount of data 714, delay profile 716, and signal 718, respectively. In this example, predicated amount of data 1002 is 1 GB, and delay profile 1104 includes five taps 1106, 1108, 1110, 1112, and 1114. First communication device 702 multiplies predicated amount of data 1102 by delay profile to 1104 generate signal 1116 having coefficients 1118, 1120, 1122, 1124, and 1126. The coefficients of signal 1116 represent respective amounts of data predicted to be ready for transfer from first communication device 702 to second communication device 704 at respective TTIs, in a manner similar to that discussed above with respect to FIGS. 8-10.

Referring again to FIG. 7, in some embodiments, delay profile 716 is fixed. For example, delay profile 716 may be configured according to a predicated operating environment of network portion 700, and delay profile 716 may remain unchanged after configuration. In some other embodiments, delay profile 716 is dynamic. For example, in some embodiments, first communication device 702 may modify the number of taps of delay profile 716 and/or the values of taps of delay profile 716, according to actual or predicted changes in an operating environment of network portion 700. In particular embodiments, delay profile 716 is an adaptive filter that first communication device 702 adjusts to achieve one or more desired goals, e.g., a desired tradeoff between low-latency of data transmission from first communication device 702 to second communication device 704 and conservation of transmission capacity of communication mediums 706.

Furthermore, second communication device 704 is optionally configured to generate a signal 720 representing an operating status of communication mediums 706. In embodiments generating signal 720, second communication device 704 transmits signal 720 to first communication device 702, and first communication device 702 is configured to adjust delay profile 716 (or signal 718) according to signal 720. For example, in a particular embodiment, first communication device 702 is configured to (a) increase a sum of taps of delay profile 716 in response to signal 720 indicating an increase in available capacity of communication mediums 706 and (b) decrease the sum of taps of delay profile 716 in response to signal 720 indicating a decrease in available capacity of communication mediums 706. Such adjustment of delay profile 716 according to capacity of communication mediums 706 may help achieve an optimal balance between low-latency of data transmission from first communication device 702 to second communication device 704 and conservation of data transmission capacity of communication mediums 706.

First communication device 702 transmits signal 718 to second communication device 704, and second communication device generates Grants G at least partially in accordance with signal 718. Each Grant G authorizes first communication device 702 to transfer a specified amount of data to second communication device 704 at a specified time, e.g., at a specified TTI, via communication mediums 706. For example, in some embodiments, second communication device 704 generates three Grants $G_0$, $G_1$, and $G_2$ in response to receiving signal 812 of FIG. 8. Grant $G_0$ authorizes first communication device 702 to transmit 0.7 GB of data to second communication device 704 at $TT_0$, Grant $G_1$ authorizes first communication device 702 to transmit 0.2 GB of data to second communication device 704 at $TTI_1$, and Grant $G_2$ authorizes first communication device 702 to transmit 0.1 GB of data to second communication device 704 at $TTI_2$. As another example, in some embodiments, second communication device 704 generates five Grants $G_0$, $G_1$, $G_2$, $G_3$, and $G_4$ in response to receiving signal 1116 of FIG. 11. Grant $G_0$ authorizes first communication device 702 to transmit 0.5 GB of data to second communication device 704 at $TTI_0$, Grant $G_1$ authorizes first communication device 702 to transmit 0.2 GB of data to second communication device 704 at $TTI_1$, Grant $G_2$ authorizes first communication device 702 to transmit no data to second communication device 704 at $TTI_2$, Grant $G_3$ authorizes first communication device 702 to transmit 0.2 GB of data to second communication device 704 at $TTI_3$, and Grant $G_4$ authorizes first communication device 702 to transmit 0.1 GB of data to second communication device 704 at $TTI_4$.

Accordingly, generation of Grants by second communication device 704 at least partially based on signal 718 may help achieve just-in-time transfer of data from first communication device 702 to second communication device 704, even when availability of data at first communication device 702 is delayed.

Figure 12:
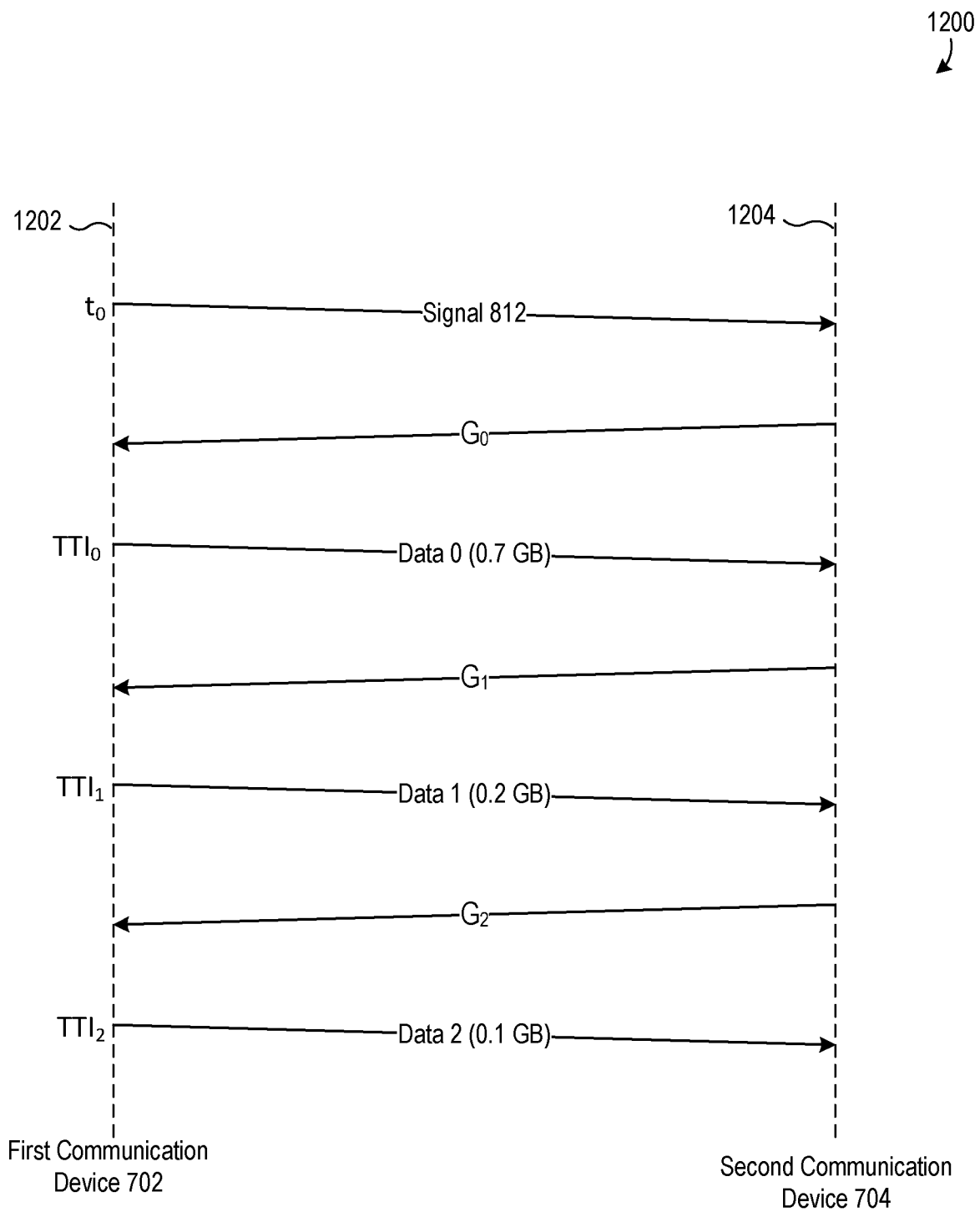
FIG. 12 is a schematic diagram illustrating uplink data transmission in the FIG. 7 network portion based on the example of FIG. 8.

FIG. 12 is a schematic diagram illustrating uplink data transmission in network portion 700 based on the example of FIG. 8 where predicted amount of data 714, delay profile 716, and signal 718 are embodied by predicted amount of data 802, delay profile 804, and signal 812, respectively. Dashed line 1202 represents first communication device 702, and dashed line 1204 represents second communication device 704. At time $t_o$, first communication device 702 transmits signal 812 to second communication device 704. Second communication device 704 responds to signal 812 by generating Grants $G_0$, $G_1$, and $G_2$. Grant $G_0$ authorizes first communication device 702 to transmit 0.7 GB of data to second communication device 704 at $TTI_0$, Grant $G_1$ authorizes first communication device 702 to transmit 0.2 GB of data to second communication device 704 at $TTI_1$, and Grant $G_2$ authorizes first communication device 702 to transmit 0.1 GB of data to second communication device 704 at $TTI_2$. In response to the Grants, first communication 702 device transmits 0.7 GB, 0.2 GB, and 0.1 GB of data to second communication device 704 at $TTI_0$, $TTI_1$, and $TTI_2$, respectively.

Figure 13:
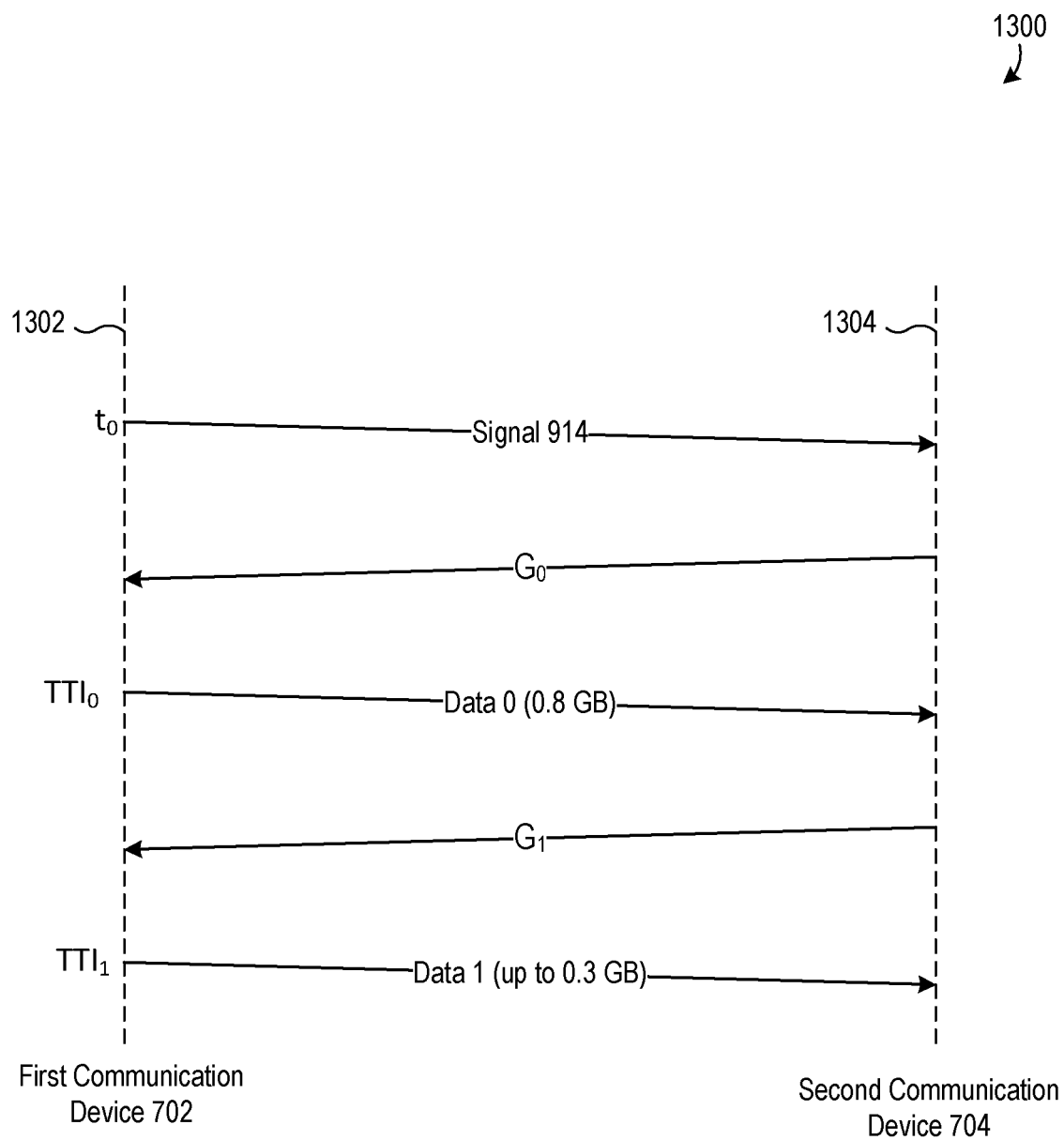
FIG. 13 is a schematic diagram illustrating uplink data transmission in the FIG. 7 network portion based on the example of FIG. 9.

FIG. 13 is a schematic diagram illustrating uplink data transmission in network portion 700 based on the example of FIG. 9 where predicted amount of data 714, delay profile 716, and signal 718 are embodied by predicted amount of data 902, delay profile 904, and signal 914, respectively. Dashed line 1302 represents first communication device 702, and dashed line 1304 represents second communication device 704. At time $t_o$, first communication device 702 transmits signal 914 to second communication device 704. Second communication device 704 responds to signal 914 by generating Grants $G_0$ and $G_1$. Grant $G_0$ authorizes first communication device 702 to transmit 0.8 GB of data to second communication device 704 at $TTI_0$, and Grant $G_1$ authorizes first communication device 702 to transmit 0.3 GB of data to second communication device 704 at $TTI_1$. In response to the Grants, first communication 702 device transmits 0.8 GB of data to second communication device 704 at $TTI_0$, and first communication 702 device transmits up to 0.3 GB to second communication device 704 at $TTI_1$. First communication 702 device does not necessarily transmit 0.3 GB to second communication device 704 at $TTI_1$ because predicted amount of data 902 is 1.0 GB, and 0.8 GB of data was transmitted at $TTI_0$. Grant $G_1$, however, authorizes first communication device 702 to transmit 0.3 GB to second communication device 704, so first communication device 702 may transmit 0.3 GB to second communication device 704 at $TTI_1$ if first communication device 702 has this much data waiting in its buffer.

Figure 14:
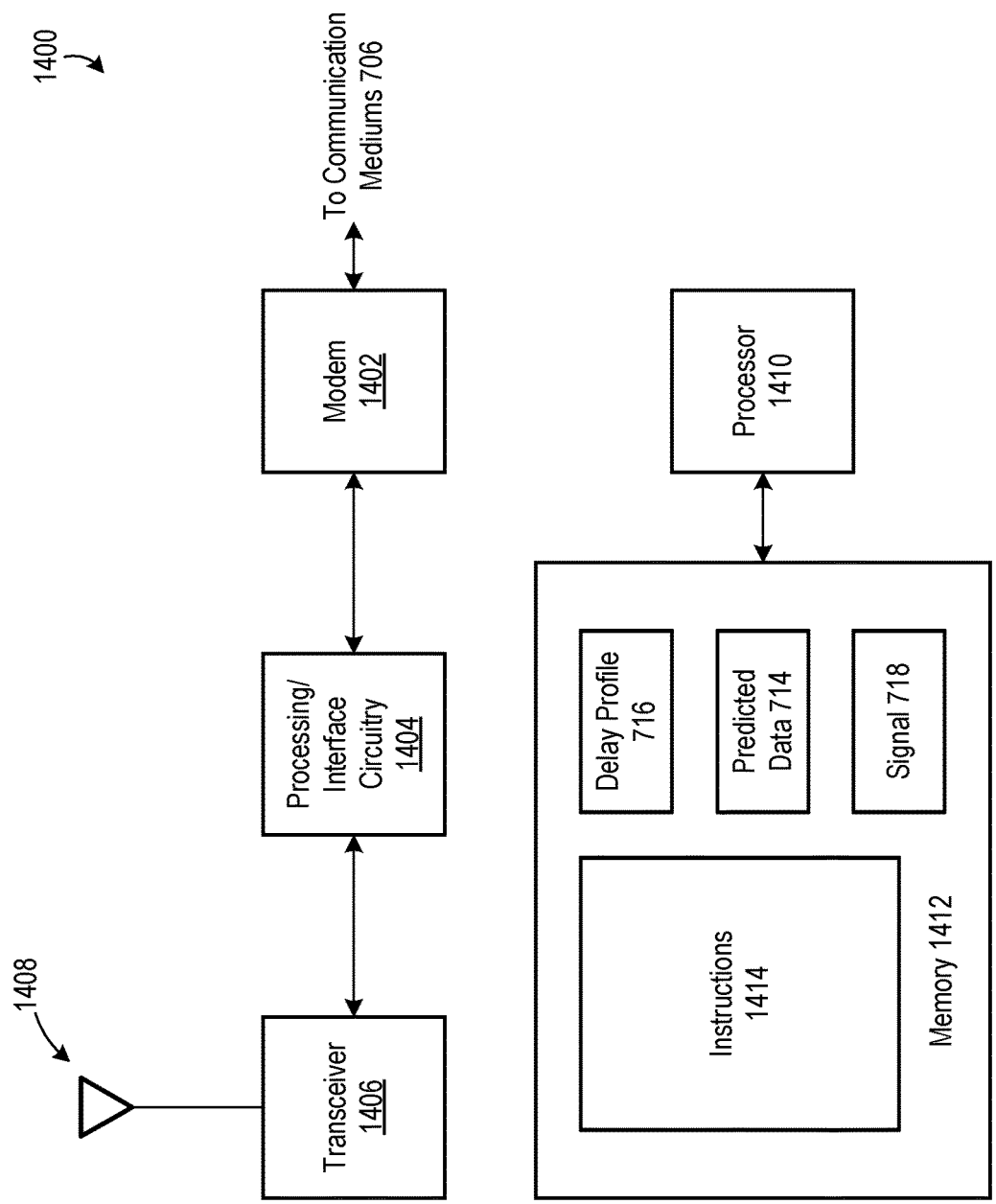
FIG. 14 is a schematic diagram illustrating a wireless base station, according to an embodiment.

FIG. 14 is a schematic diagram illustrating a wireless base station 1400, which is one possible embodiment of first communication device 702. In some embodiments, wireless base station 1400 is one of a 3G wireless base station, LTE wireless base station, a 5G wireless base station, a 6G wireless station, an eNodeB, a gNodeB, any similar wireless base station, a component of a split wireless base station (e.g. a radio unit), and/or may be any variations, improvement and/or evolutions thereof. Wireless base station 1400 includes a modem 1402, processing/interface circuitry 1404, a transceiver 1406, an antenna 1408, a processor 1410, and a memory 1412. Modem 1402 is configured to communicatively couple wireless base station 1400 with a communication medium. In some embodiments, modem 1402 communicates over a coaxial cable communication medium or an HFC communication medium, using a DOCSIS protocol. In some other embodiments, modem 1402 communicates over a fiber optic communication medium, a microwave communication medium, a satellite communication medium, or a Wi-Fi communication medium. Processing/interface circuitry 1404 performs processing on signals transmitted to and from transceiver 1406, and processing/interface circuitry 1404 also interfaces transceiver 1406 with modem 1402. Transceiver 1406 converts radio signals to electrical or optical signals and vice versa, and antenna 1408 transmits and receives radio signals 712 (see FIG. 7).

Processor 1410 executes instructions 1414 in the form of software and/or firmware stored in memory 1412 to control wireless access point 1400. Connections between processor 1410 and other elements of wireless access point 1400 are not shown to promote illustrative clarity. Processor 1410 further executes instructions 1414 to modify amount of predicted data 714 according to data delay profile 716 to generate signal 718. Amount of predicted data 714, delay profile 716, and signal 718 are stored in memory 1412.

Figure 15:
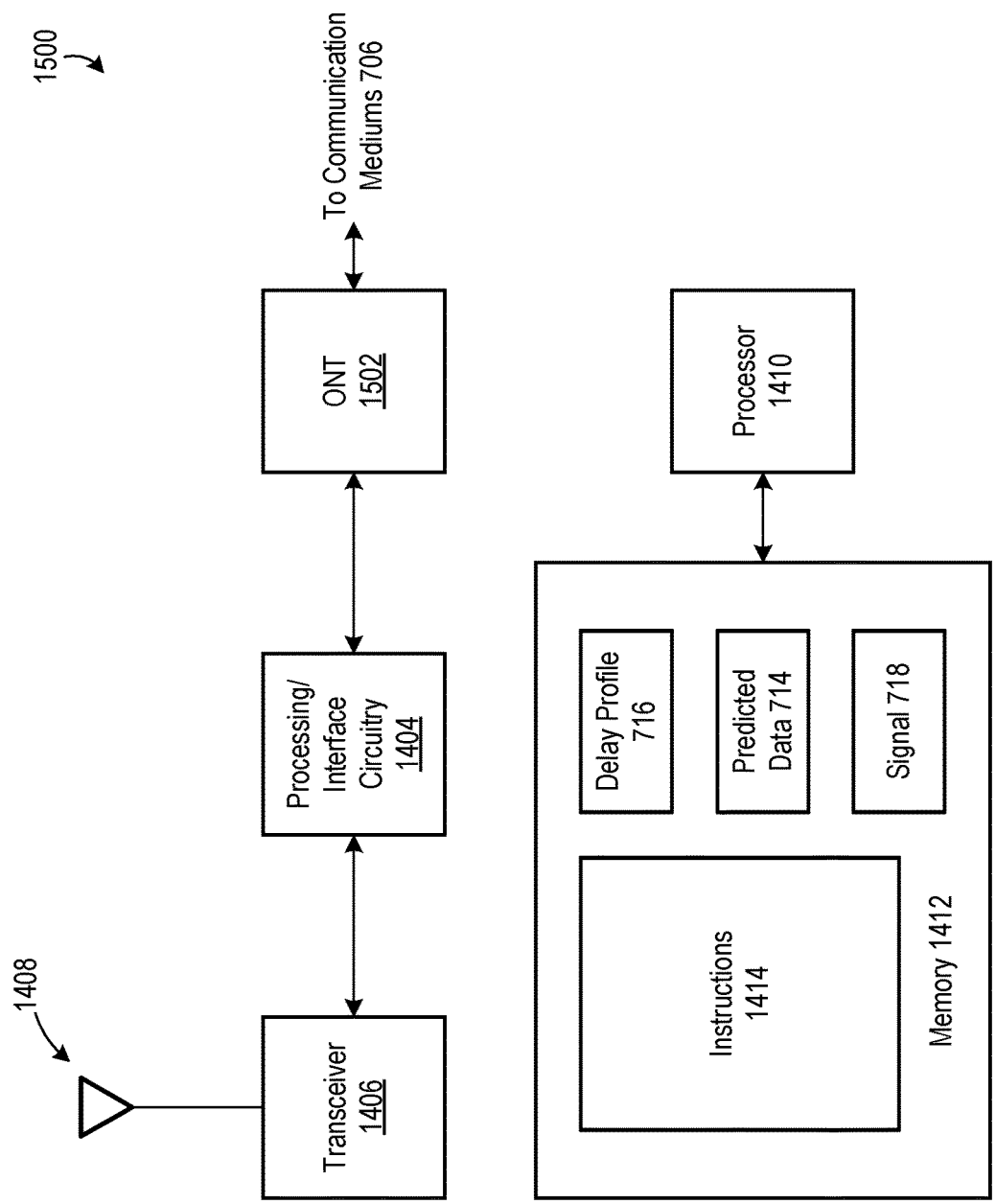
FIG. 15 is a schematic diagram illustrating another wireless base station, according to an embodiment.

FIG. 15 is a schematic diagram illustrating a wireless base station 1500, which is another possible embodiment of first communication device 702. Wireless base station 1500 is similar to wireless base 1400 of FIG. 14 but with modem 1402 replaced with an optical network terminal (ONT) 1502 configured to communicatively couple wireless base station 1500 with a fiber optic communication medium. In some embodiments, ONT 1502 communicates with second communication device 704 using an optical protocol. Examples of the optical protocol include, but are not limited to, a EPON protocol, a RFOG protocol, or a GPON protocol. Accordingly, wireless base station 1400 is intended for embodiments of network portion 700 where communication mediums 706 include a fiber optic communication medium.

Figure 16:
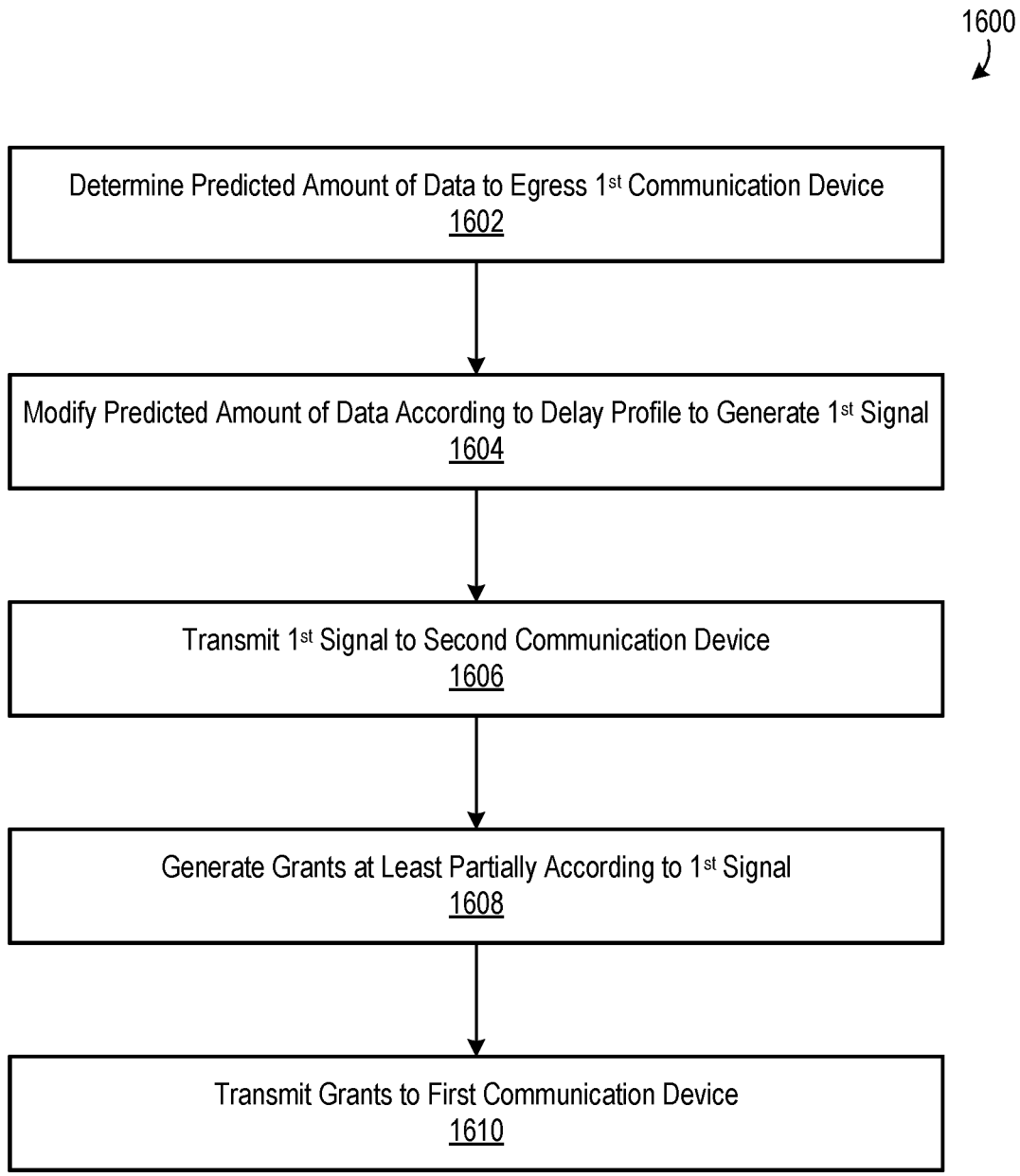
FIG. 16 is a flow chart illustrating a method for mitigating delay in availability of data in a network, according to an embodiment.

FIG. 16 is a flow chart 1600 illustrating a method for mitigating delay in availability of data in a network. In block 1602, an amount of data to egress a first communication device is predicted. In one example of block 1602, first communication device 702 determines a predicted amount of data 714 to egress first communication device. In block 1604, the predicted amount of data to egress the first communication device is modified according to a data delay profile, to generate a first signal representing anticipated upcoming data transmission by the first communication device. In one example of block 1604, first communication device 702 multiplies predicted amount of data 714 by data delay profile 716 to generate signal 718. In block 1606, the first signal is transmitted from the first communication device to the second communication device. In one example of block 1606, first communication device 702 transmits signal 718 to second communication device 704. In block 1608, Grants are generated at the second communication device at least partially in accordance with the first signal, where each Grant authorizes the first communication device to transfer data via the network. In one example of block 1608, second communication device 704 generates one or more grants G in response to receipt of signal 718. In block 1610, the one or more Grants are transmitted from the second communication device to the first communication device. In one example of block 1610, second communication device 704 transmits one or more grants G to first communication device 702.

Combinations of Features

Features described above may be combined in various ways without departing from the scope hereof. The following examples illustrate some possible combinations:

(A1) A method for mitigating delay in availability of data in a communication network may include (1) predicting an amount of data to egress a first communication device; (2) modifying the predicted amount of data to egress the first communication device according to a data delay profile, to generate a first signal representing anticipated upcoming data transmission by the first communication device, the data delay profile representing delay in availability of data at the first communication device; (3) transmitting the first signal from the first communication device to the second communication device; (4) generating one or more Grants at the second communication device at least partially in accordance with the first signal, each Grant authorizing the first communication device to transfer data via the communication network; and (5) transmitting the one or more Grants from the second communication device to the first communication device.

(A2) In the method denoted as (A1), the data delay profile may represent delay in availability of data at the first communication device due to fragmentation of data being transmitted from a third communication device to the first communication device.

(A3) In the method denoted as (A2), the first communication device may include a wireless base station, and the third communication device may include a user equipment device wirelessly transmitting data to the wireless base station.

(A4) In the method denoted as (A3), the wireless base station may include one of a 3G wireless base station, a LTE wireless base station, a 5G wireless base station, and a 6G wireless base station.

(A5) In the method denoted as (A1), the data delay profile may represent delay in availability of data at the first communication device due to failure of data to be transmitted from a third communication device to the first communication device.

(A6) In the method denoted as (A5), the first communication device may include a wireless base station, and the third communication device may include a user equipment device wirelessly transmitting data to the wireless base station.

(A7) In the method denoted as (A6), the wireless base station may include one of a 3G wireless base station, a LTE wireless base station, a 5G wireless base station, and a 6G wireless base station.

(A8) Any one of the methods denoted as (A1) through (A7) may further include transmitting data from the first communication device to the second communication device via one or more communication mediums in response to receiving the one or more Grants at the first communication device.

(A9) In the method denoted as (A8), the one or more communication mediums may include a coaxial cable communication medium.

(A10) In the method denoted as (A9), transmitting data from the first communication device to the second communication device via the one or more communication mediums may include transmitting data from the first communication device to the second communication device via the coaxial cable communication medium using a DOCSIS protocol.

(A11) In the method denoted as (A8), the one or more communication mediums may include a fiber optic communication medium.

(A12) Any of the methods denoted as (A1) through (A11) may further include (1) transmitting a third signal from the second communication device to the first communication device, the third signal representing an operating status of one or more communication mediums communicatively coupling the first communication device with the second communication device, and (2) generating the data delay profile according to the third signal.

(A13) In the method denoted as (A12), the third signal may represent available data carrying capacity of the one or more communication mediums communicatively coupling the first communication device with the second communication device.

(B1) A communication network may include a first communication device, a second communication device, and one or more communication mediums. The first communication device may be configured to (1) predict an amount of data to egress the first communication device, and (2) modify the predicted amount of data to egress the first communication device according to a data delay profile, to generate a first signal representing anticipated upcoming data transmission by the first communication device, where the data delay profile represents delay in availability of data at the first communication device. The second communication device may be configured to generate one or more Grants at least partially in accordance with the first signal, where each Grant authorizes the first communication device to transfer data via the communication network. The one or more communication mediums may communicatively couple the first communication device with the second communication device.

(B2) In the network denoted as (B1), the data delay profile may represent delay in availability of data at the first communication device due to fragmentation of data being transmitted from a third communication device to the first communication device.

(B3) In the networks denoted as (B2), the first communication device may include a wireless base station.

(B4) In the network denoted as (B3), the wireless base station may include one of a 3G wireless base station, a LTE wireless base station, a 5G wireless base station, and a 6G wireless base station.

(B5) In the network denoted as (B1), the delay profile may represent delay in availability of data at the first communication device due to failure of data to be transmitted from the third communication device to the first communication device.

(B6) In the network denoted as (B5), the first communication device may include a wireless base station.

(B7) In the network denoted as (B6), the wireless base station may include one of a 3G wireless base station, a LTE wireless base station, a 5G wireless base station, and a 6G wireless base station.

(B8) In any one of the networks denoted as (B1) through (B7), the one or more communication mediums may include a coaxial cable communication medium.

(B9) In any one of the networks denoted as (B1) through (B7), the one or more communication mediums may include a fiber optic communication medium.

(B10) In any one of networks denoted as (B1) through (B9), the second communication device may be configured to generate a third signal representing an operating status of the one or more communication mediums, and the first communication device may be further configured to adjust the data delay profile according to the third signal.

(B11) In the network denoted as (B10), the third signal may represent available data carrying capacity of the one or more communication mediums communicatively coupling the first communication device with the second communication device.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for mitigating delay in availability of data in a communication network, comprising:
    modifying a predicted amount of data according to a data delay profile to generate a first signal representing anticipated upcoming data transmission by a first communication device to a second communication device, the predicted amount of data being an amount of data predicted to egress the first communication device for the second communication device, and the data delay profile representing delay in availability of data at the first communication device; and
    sending the first signal from the first communication device to the second communication device.

2. The method of claim 1, wherein the data delay profile represents delay in availability of data at the first communication device due to fragmentation of data being transmitted from a third communication device to the first communication device.

3. The method of claim 2, wherein:
    the first communication device comprises a wireless base station; and
    the third communication device comprises a user equipment device wirelessly transmitting data to the wireless base station.

4. The method of claim 1, wherein the data delay profile represents delay in availability of data at the first communication device due to failure of data to be transmitted from a third communication device to the first communication device.

5. The method of claim 4, wherein:
    the first communication device comprises a wireless base station; and
    the third communication device comprises a user equipment device wirelessly transmitting data to the wireless base station.

6. The method of claim 1, wherein the first communication device comprises a wireless base station.

7. The method of claim 1, further comprising receiving one or more grants from the second communication device, after sending the first signal to the second communication device.

8. The method of claim 7, further comprising transmitting data to the second communication device, in response to receiving the one or more grants from the second communication device.

9. The method of claim 1, wherein the data delay profile comprises a plurality of taps.

10. A method for mitigating delay in availability of data in a communication network, comprising:
    modifying a predicted amount of data according to a data delay profile to generate a first signal representing anticipated upcoming data transmission by a first communication device to a second communication device, the predicted amount of data being an amount of data predicted to egress the first communication device for the second communication device, and the data delay profile representing delay in availability of data at the first communication device;
    sending the first signal from the first communication device to the second communication device; and
    changing a quantity of taps of the data delay profile in response to an actual change, or a predicted change, in a communication network operating environment.

11. A method for mitigating delay in availability of data in a communication network, comprising:
    modifying a predicted amount of data according to a data delay profile to generate a first signal representing anticipated upcoming data transmission by a first communication device to a second communication device, the predicted amount of data being an amount of data predicted to egress the first communication device for the second communication device, and the data delay profile representing delay in availability of data at the first communication device;
    sending the first signal from the first communication device to the second communication device; and
    changing respective values of one or more taps of the data delay profile in response to an actual change, or a predicted change, in a communication network operating environment.

12. A method for mitigating delay in availability of data in a communication network, comprising:
    modifying a predicted amount of data according to a data delay profile to generate a first signal representing anticipated upcoming data transmission by a first communication device to a second communication device, the predicted amount of data being an amount of data predicted to egress the first communication device for the second communication device, and the data delay profile representing delay in availability of data at the first communication device;
    sending the first signal from the first communication device to the second communication device; and
    changing the data delay profile in response to a signal from the second communication device.

13. The method of claim 12, wherein the signal from the second communication device represents an operating status of one or more communication mediums between the first and second communication devices.

14. The method of claim 12, wherein changing the data delay profile comprises changing a sum of a plurality of tap values of the data delay profile.

15. The method of claim 1, further comprising determining the predicted amount of data.

16. A method for mitigating delay in availability of data in a communication network, comprising: determining, at least partially from information received at a first communication device from one or more user equipment devices downstream of the first communication device, a predicted amount of data to egress the first communication device for a second communication device upstream of the first communication device; modifying the predicted amount of data according to a data delay profile to generate a first signal representing anticipated upcoming data transmission by the first communication device to the second communication device, the data delay profile representing delay in availability of data received at the first communication device from the one or more user equipment devices; and sending the first signal from the first communication device to the second communication device.

17. The method of claim 16, wherein the data delay profile represents delay in availability of data at the first communication device due to fragmentation of data being transmitted from the one or more user equipment devices to the first communication device.

18. The method of claim 16, wherein the data delay profile represents delay in availability of data at the first communication device due to failure of data to be transmitted from the one or more user equipment devices to the first communication device.

19. The method of claim 16, wherein the first communication device comprises a wireless base station.

20. The method of claim 16, further comprising sending data from the first communication device to the second communication device in response to receiving, at the first communication device, one or more Grants from the second communication device.

* * * * *